US012457596B2

(12) United States Patent
Tiirola et al.

(10) Patent No.: US 12,457,596 B2
(45) Date of Patent: Oct. 28, 2025

(54) FREQUENCY DOMAIN RESOURCE ALLOCATION IN WIRELESS NETWORKS

(71) Applicant: Nokia Technologies Oy, Espoo (FI)

(72) Inventors: Esa Tapani Tiirola, Oulu (FI); Oskari Tervo, Oulu (FI); Ismael Peruga Nasarre, Oulu (FI); Arto Lehti, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/114,331

(22) PCT Filed: Sep. 19, 2023

(86) PCT No.: PCT/EP2023/075742
§ 371 (c)(1),
(2) Date: Mar. 21, 2025

(87) PCT Pub. No.: WO2024/061872
PCT Pub. Date: Mar. 28, 2024

(65) Prior Publication Data
US 2025/0267640 A1    Aug. 21, 2025

(30) Foreign Application Priority Data
Sep. 23, 2022 (FI) .................................. 20225828

(51) Int. Cl.
*H04W 72/0453* (2023.01)
*H04L 5/00* (2006.01)

(52) U.S. Cl.
CPC ....... *H04W 72/0453* (2013.01); *H04L 5/0044* (2013.01); *H04L 5/0098* (2013.01)

(58) Field of Classification Search
CPC . H04W 72/0453; H04L 5/0044; H04L 5/0098
See application file for complete search history.

(56) References Cited

U.S. PATENT DOCUMENTS

2021/0281371 A1* 9/2021 Wei ....................... H04L 5/0012

FOREIGN PATENT DOCUMENTS

EP           4027601 A1     7/2022
WO    WO-2015139304 A1 *   9/2015   ............ H04W 16/06
(Continued)

OTHER PUBLICATIONS

English translation of WO-2015139304-A1, 2015, retrieved from PE2E Search on Jun. 17, 2025 (Year: 2015).*

(Continued)

*Primary Examiner* — Omar J Ghowrwal
(74) *Attorney, Agent, or Firm* — Nokia Technologies Oy

(57) ABSTRACT

A method including receiving, by a user device from a network node, a configuration including at least an indication to perform spectrum extension; determining a target extension factor for excess band frequency resources for a target spectrum extension; receiving information indicating a set of inband frequency resources allocated to the user device for uplink transmission; determining, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources; performing, by the user device, a spectrum extension based on the excess band frequency resources for a set of frequency domain values, to obtain a spectrum extended signal; and transmitting the spectrum extended signal.

19 Claims, 7 Drawing Sheets

(56) References Cited

FOREIGN PATENT DOCUMENTS

| WO | 2018/085561 A1 | 5/2018 |
|---|---|---|
| WO | 2022/152368 A1 | 7/2022 |

OTHER PUBLICATIONS

English translation of Office action received for corresponding Korean Patent Application No. 10-2025-7013238, dated Jun. 3, 2025, 3 pages, retrieved by STIC on Jul. 15, 2025 (Year: 2025).*
"Considerations for Coverage Enhancement", 3GPP TSG RAN WG1 Meeting #101-e, R1-2004377, Agenda: 8.4.1, IITH, May 25-Jun. 5, 2020, 2 pages.
"3rd Generation Partnership Project; Technical Specification Group Radio Access Network; NR; User Equipment (UE) radio transmission and reception; Part 1: Range 1 Standalone (Release 17)", 3GPP TS 38.101-1, V17.6.0, Jun. 2022, 720 pages.
"3rd Generation Partnership Project; Technical Specification Group Radio Access Network; NR; User Equipment (UE) radio transmission and reception; Part 2: Range 2 Standalone (Release 17)", 3GPP TS 38.101-2, V17.6.0, Jun. 2022, pp. 1-219.
"On spectrum shaping for uplink Pi/2 BPSK with DFT-S-OFDM", 3GPP TSG-RAN WG1#89, R1-1709002, Agenda: 7.1.5, Nokia, May 15-19, 2017, 3 pages.
"Further Link Results for p/2 BPSK DFT-S-OFDM Waveform with Spectrum Shaping and MMSE Receiver", 3GPP TSG RAN WG4 Meeting #85, R4-1714191, Agenda: 9.4.3.2, IITH, Nov. 27-Dec. 1, 2017, 4 pages.
"Performance evaluation for pi/2 BPSK with FDSS", 3GPP TSG RAN WG1 Meeting #88bis, R1-1705060, Agenda: 8.1.10, Huawei, Apr. 3-7, 2017, 8 pages.
"On the detection performance of pi/2-BPSK DFT-s-OFDM with transparent shaping", 3GPP TSG-RAN WG4 Meeting #84bis, R4-1710213, Agenda: 9.4.3.10, Huawei, Oct. 9-13, 2017, 4 pages.
"DFT-Spread OFDM with Pulse Shaping Filter in Frequency Domain in Evolved UTRA Uplink", 3GPP TSG RAN WG1 #42 on LTE, R1-050702, Agenda: 10.3, NTT Docomo, Aug. 29-Sep. 2, 2005, pp. 1-8.
"RF signal aspects to frequency and time domain implementations of SC-FDMA", 3GPP TSG-RAN WG1 Meeting #42, R1-050817, Agenda: 10.1, Nokia, Aug. 29-Sep. 2, 2005, 3 pages.
"RAN Chair's Summary for RAN Release 18", 3GPP TSG RAN#93-e, RP-211679, Agenda: 9, RAN Chair, Sep. 13-17, 2021, pp. 1-43.
"New WID on NR UL Enhancements", 3GPP TSG RAN Meeting #94e, RP-212702, Agenda: 8A.1, NTT Docomo Inc, Dec. 6-17, 2021, 5 pages.
"New WI: Further NR coverage enhancements", 3GPP TSG RAN Meeting #94e, RP-213579, Agenda: 8.6.1, China Telecom, Dec. 6-17, 2021, 5 pages.
"On spectrum shaping for uplink Pi/2 BPSK with DFT-S-OFDM", 3GPP TSG RAN WG1 NR Ad-Hoc#2, R1-1711398, Agenda: 5.1.5, Nokia, Jun. 27-30, 2017, 4 pages.
"3rd Generation Partnership Project; Technical Specification Group Radio Access Network; NR; Physical channels and modulation (Release 17)", 3GPP TS 38.211, V17.2.0, Jun. 2022, pp. 1-136.
"3rd Generation Partnership Project; Technical Specification Group Radio Access Network; NR; Physical layer procedures for control (Release 17)", 3GPP TS 38.213, V17.2.0, Jun. 2022, pp. 1-256.
"RAN1 impacts for power domain enhancements", 3GPP TSG RAN WG1 #110bis-e, R1-2210166, Agenda: 9.14.2, Nokia, Oct. 10-19, 2022, 12 pages.
"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
"Meeting IMT2030 Performance Targets: The Potential of OTFDM Waveform and Structural MIMO Technologies", Bharat 6G Alliance, Jul. 2023, 28 pages.
"Uplink coverage enhancements", 3GPP TSG RAN Meeting #100, RP-230864, Agenda: 9.3.1.3, Nokia, Jun. 12-14, 2023, 7 pages.
Office action received for corresponding Finnish Patent Application No. 20225828, dated Jan. 19, 2023, 8 pages.
"Discussion on approaches and solutions for NR PUSCH coverage enhancement", 3GPP TSG RAN WG1 #103, R1-2009792, Agenda: 8.8.2.1, Nokia, Oct. 26-Nov. 13, 2020, 16 pages.
Office action received for corresponding Finnish Patent Application No. 20225828, dated Jun. 14, 2023, 6 pages.
Office action received for corresponding Korean Patent Application No. 10-2025-7013238, dated Jun. 3, 2025, 3 pages of office action and No. page of translation available.

* cited by examiner

| Inband PRBs | Extension factor (α) | | | | | | | | |
|---|---|---|---|---|---|---|---|---|---|
| | 0,5 | 0,375 | 0,33333 | 0,25 | 0,2 | 0,167 | 0,143 | 0,111 | 0,1 |
| 1 | 2 | 1,60 | 1,50 | 1,33 | 1,25 | 1,20 | 1,17 | 1,13 | 1,11 |
| 2 | 4 | 3,20 | 3 | 2,67 | 2,50 | 2,40 | 2,33 | 2,25 | 2,22 |
| 3 | 6 | 4,80 | 4,80 | 4 | 3,75 | 3,60 | 3,50 | 3,38 | 3,33 |
| 4 | 8 | 6,40 | 6 | 5,33 | 5 | 4,80 | 4,67 | 4,50 | 4,44 |
| 5 | 10 | 8 | 7,50 | 6,67 | 6,25 | 6 | 5,83 | 5,63 | 5,56 |
| 6 | 12 | 9,60 | 9 | 8 | 7,50 | 7,20 | 7 | 6,75 | 6,67 |
| 8 | 16 | 12,80 | 12 | 10,67 | 10 | 9,60 | 9,33 | 9 | 8,89 |
| 9 | 18 | 14,40 | 13,50 | 12 | 11,25 | 10,80 | 10,50 | 10,13 | 10 |
| 10 | 20 | 16 | 15 | 13,33 | 12,50 | 12 | 11,67 | 11,25 | 11,11 |
| 12 | 24 | 19,20 | 18 | 16 | 15 | 14,40 | 14 | 13,50 | 13,33 |
| 15 | 30 | 24 | 22,50 | 20 | 18,75 | 18 | 17,50 | 16,88 | 16,67 |
| 16 | 32 | 25,60 | 24 | 21,33 | 20 | 19,20 | 18,67 | 18 | 17,78 |
| 18 | 36 | 28,80 | 27 | 24 | 22,50 | 21,60 | 21 | 20,25 | 20 |
| 20 | 40 | 32 | 30 | 26,67 | 25 | 24 | 23,33 | 22,50 | 22,22 |
| 24 | 48 | 38,40 | 36 | 32 | 30 | 28,80 | 28 | 27 | 26,67 |
| 25 | 50 | 40 | 37,50 | 33,33 | 31,25 | 30 | 29,17 | 28,13 | 27,78 |
| 27 | 54 | 43,20 | 40,50 | 36 | 33,75 | 32,40 | 31,50 | 30,38 | 30 |
| 30 | 60 | 48 | 45 | 40 | 37,50 | 36 | 35 | 33,75 | 33,33 |
| 32 | 64 | 51,20 | 48 | 42,67 | 40 | 38,40 | 37,33 | 36 | 35,56 |
| 36 | 72 | 57,60 | 54 | 48 | 45 | 43,20 | 42 | 40,50 | 40 |
| 40 | 80 | 64 | 60 | 53,33 | 50 | 48 | 46,67 | 45 | 44,44 |
| 45 | 90 | 72 | 67,50 | 60 | 56,25 | 54 | 52,50 | 50,63 | 50 |
| 48 | 96 | 76,80 | 72 | 64 | 60 | 57,60 | 56 | 54 | 53,33 |
| 50 | 100 | 80 | 75 | 66,67 | 62,50 | 60 | 58,33 | 56,25 | 55,56 |
| 54 | 108 | 86,40 | 81 | 72 | 67,50 | 64,80 | 63 | 60,75 | 60 |
| 60 | 120 | 96 | 90 | 80 | 75 | 72 | 70 | 67,50 | 66,67 |
| 64 | 128 | 102,40 | 96 | 85,33 | 80 | 76,80 | 74,67 | 72 | 71,11 |
| 72 | 144 | 115,20 | 108 | 96 | 90 | 86,40 | 84 | 81 | 80 |
| 75 | 150 | 120 | 112,50 | 100 | 93,75 | 90 | 87,50 | 84,38 | 83,33 |
| 80 | 160 | 128 | 120 | 106,67 | 100 | 96 | 93,33 | 90 | 88,89 |
| 81 | 162 | 129,60 | 121,50 | 108 | 101,25 | 97,20 | 94,50 | 91,13 | 90 |
| 90 | 180 | 144 | 135 | 120 | 112,50 | 108 | 105 | 101,25 | 100 |
| 96 | 192 | 153,60 | 144 | 128 | 120 | 115,20 | 112 | 108 | 106,67 |
| 100 | 200 | 160 | 150 | 133,33 | 125 | 120 | 116,67 | 112,50 | 111,11 |

Table showing a total allocation size (in RBs) as a function of target extension factor and inband allocation size (RBs)

FIG. 7

FREQUENCY DOMAIN RESOURCE ALLOCATION IN WIRELESS NETWORKS

RELATED APPLICATION

This application claims priority to PCT Patent Application No. PCT/EP2023/075742, filed Sep. 19, 2023, and entitled "FREQUENCY DOMAIN RESOURCE ALLOCATION IN WIRELESS NETWORKS", which claims priority from Finnish Application No. 20225828, filed on Sep. 23, 2022, and entitled "FREQUENCY DOMAIN RESOURCE ALLOCATION IN WIRELESS NETWORKS", which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. 5G-Advanced has been developed based on NR Rel-18. 6G is also being developed, and will be developed more in the future, with even more demanding applications.

SUMMARY

According to an example embodiment, a method may include receiving, by a user device from a network node, a configuration including at least an indication to perform spectrum extension; determining, by the user device, a target extension factor for excess band frequency resources for a target spectrum extension; receiving, by the user device from the network node, information indicating a set of inband frequency resources allocated to the user device for uplink transmission; determining, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources; performing, by the user device, a spectrum extension based on the excess band frequency resources for a set of frequency domain values, to obtain a spectrum extended signal; and transmitting the spectrum extended signal.

According to an example embodiment, an apparatus includes at least one processor, and at least one memory including computer program code, the at least one memory and the computer program code configured to, with the at least one processor, cause the apparatus at least to receive, by a user device from a network node, a configuration including at least an indication to perform spectrum extension; determine, by the user device, a target extension factor for excess band frequency resources for a target spectrum extension; receive, by the user device from the network node, information indicating a set of inband frequency resources allocated to the user device for uplink transmission; determine, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources; perform, by the user device, a spectrum extension based on the excess band frequency resources for a set of frequency domain values, to obtain a spectrum extended signal; and transmit the spectrum extended signal.

Other example embodiments are provided or described for various described example methods, including: means for performing any of the example methods; and a non-transitory computer-readable storage medium including instructions stored thereon that, when executed by at least one processor, are configured to cause a computing system to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 7 is a diagram illustrating an example table that may be known and/or used by both UE and gNB, and shows different total allocation sizes (in RBs) for different inband allocation sizes (in RBs) and different target extension factors ($\alpha$).

DETAILED DESCRIPTION

Figure 1:
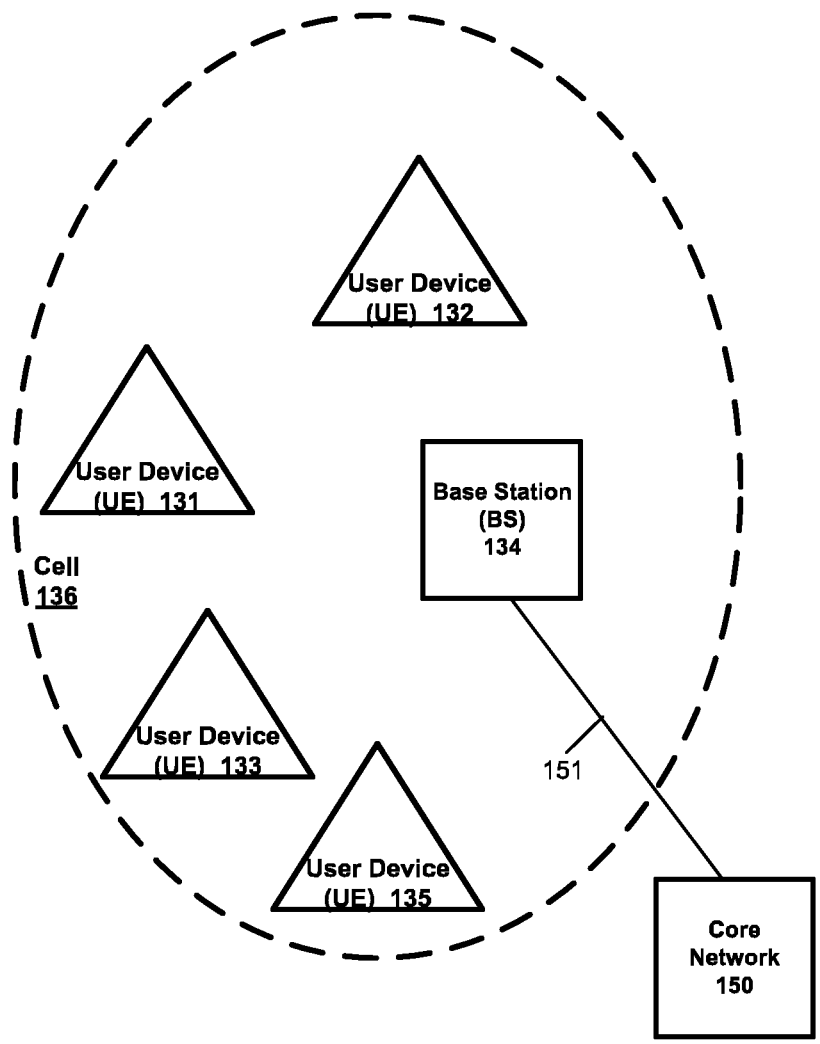
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example:

machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks. Other wireless networks, such as 6G, are also being developed and will be developed in the future.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as 5G (New Radio (NR)), 6G, LTE, LTE-A, cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

A peak-to-average power (PAPR) ratio may, for example, refer to a ratio between a maximum instantaneous power and the average power of a signal, such as for an Orthogonal Frequency Division Multiplexing (OFDM) signal. Low PAPR transmissions may significantly increase a cell coverage or cell range, as a low PAPR transmission may allow for a high (or higher) power transmission without saturating the power amplifier at the transmitter. In other words, a signal (or a waveform) having low PAPR can be transmitted with smaller output power backoff. 3GPP defines maximum power reduction (MPR) requirements for different waveforms and modulations, which means the maximum allowed reduction of transmit power (i.e., backoff).

A Pi/2-Binary Phase Shift Keying (Pi/2-PBSK) modulation scheme has been introduced for New Radio (NR/5G) to support low PAPR uplink data transmissions using a Discrete Fourier Transform-spread-Orthogonal Frequency Division Multiplexing (DFT-spread-OFDM) waveform (data). For NR uplink (UL) communications, 3GPP NR decided to apply FDSS (Frequency Domain Spectral Shaping) for pi/2 BPSK modulation without spectrum extension for data. Other modulation schemes may advantageously be used as well in combination with PAPR reduction techniques, for example, such as quadrature phase shift keying (QPSK).

Spectrum (or spectral) shaping, e.g., which may include frequency domain spectrum shaping (FDSS), is a PAPR reduction technique that may be performed in either time domain (e.g., before a Discrete Fourier Transform step at the transmitter or after an Inverse Discrete Fourier Transform step) or in frequency domain (e.g., after a Discrete Fourier Transform but before an Inverse Discrete Fourier Transform step). Spectrum shaping may include the use of a filter to adjust the amplitude of one or more subcarriers or spectral components of a signal, e.g., in order to reduce PAPR for a transmitted signal or increase the maximum transmit power in certain scenarios or obtain other desired benefit. Some spectral shaping filters may provide a rounding function in which subcarriers or spectral components, e.g., near an edge of a channel or portion of bandwidth may be decreased or rounded-off, in order to reduce PAPR of the transmitted signal. Some example filters that may be used to provide spectrum shaping may include, e.g., a time domain precoding or time domain filter, including at least one of a (1+D) or a (x 1 x) filter or a time domain filter with more than three taps; a frequency domain filter; a raised cosine (RC) filter; a root raised cosine (RRC) filter; and/or a truncated filter, as some examples. Other spectrum shaping functions or filters may be used. Spectrum shaping may be performed either without spectrum extension, or with a spectrum extension.

A spectrum (or spectral) extension may also be performed to reduce (or further reduce) PAPR of a signal. Spectrum extension may extend or increase the spectrum or range of frequencies of a signal, and thereby reduce PAPR of the signal. For example, a cyclic extension may be used to perform spectrum extension in the frequency domain for a signal. A cyclic extension may involve copying a portion of DFT outputs (or frequency domain values output by a DFT block) at the end of DFT outputs and appends those frequency domain values to the beginning of the DFT outputs, which results in adding additional frequency domain values or excess (or additional) frequency bands in both sides of the originally generated signal before the extension. This increases the spectrum or range of frequencies of the frequency domain values output by the DFT, thus causing a spectrum extension or increase in frequency range of the original signal. Also, at least in some cases, both spectrum shaping and spectrum extension, where the spectrum shaping is applied to the signal after the extension, may be used for a signal to provide even greater reduction of PAPR of the signal. According to an example embodiment, FDSS with spectrum extension may provide considerable or significant coverage gain for QPSK modulated symbols. Thus, the data input to the transmitter described below in FIG. 3 may be QPSK modulated data or symbols, for example.

According to an example embodiment, various techniques are described for a UE (or user device) to determine a spectrum (or spectral) extension, e.g., based on signalled or provided parameters from the gNB or network node (or based on signals or information communicated between the UE and gNB).

Figure 2:
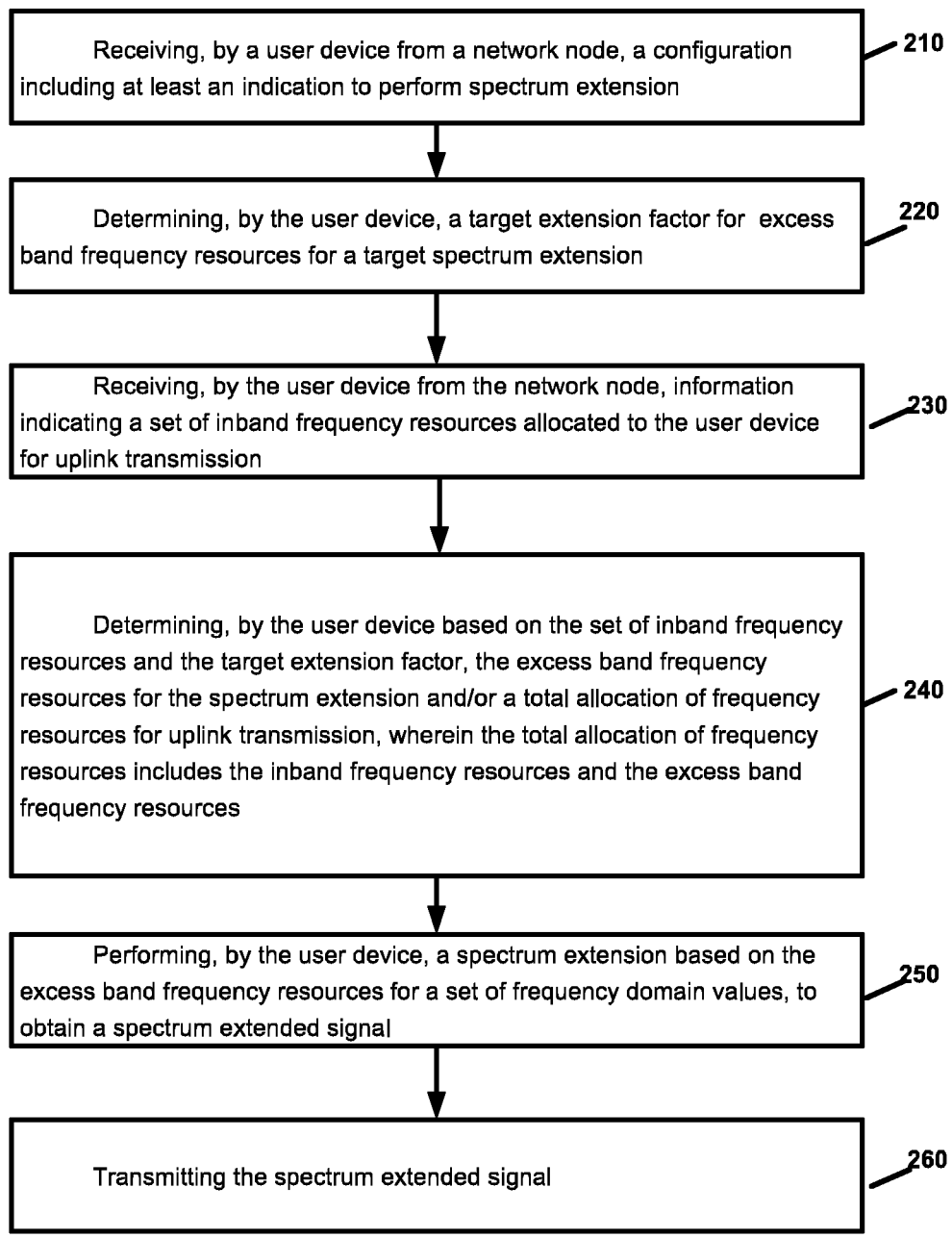
FIG. 2 is a flow chart illustrating operation of a user device (UE) according to an example embodiment.

FIG. 2 is a flow chart illustrating operation of a user device (or UE) according to an example embodiment. Operation 210 includes receiving, by a user device from a network node, a configuration including at least an indication to perform spectrum extension. Operation 220 includes determining, by the user device, a target extension factor for excess band frequency resources for a target spectrum extension. Operation 230 includes receiving, by the user device from the network node, information indicating a set of inband frequency resources allocated to the user device for uplink transmission. Operation 240 includes determining, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources. Operation 250 includes performing, by the user device, a spectrum extension based on the excess band frequency resources for a set of frequency domain values, to obtain a spectrum extended signal. And, operation 260 includes transmitting the spectrum extended signal.

For the method of FIG. 2, the determining, by the user device, the target extension factor may include receiving by the user device from the network node, information identifying the target extension factor for a target extension to determine the excess band frequency resources for the spectrum extension.

For the method of FIG. 2, the method may further include transmitting, by the user device to the network node, information indicating that the user device has a capability to perform spectrum extension for uplink transmission.

For the method of FIG. 2, the performing a spectrum extension may include performing, by the user device, a symmetric extension to the inband frequency resources by appending a first half of the excess band frequency resources to an upper end of the inband frequency resources and appending a second half of the excess band frequency resources to a lower end of the inband frequency resources.

For the method of FIG. 2, the performing a spectrum extension may include performing, by the user device, a symmetric extension to the inband frequency resources by appending a number of lowest inband frequency resources to the excess band frequency resources adjacent to the highest inband frequency resources, and appending the number of higher inband frequency resources to the excess band frequency resources adjacent to the lowest inband frequency resources.

For the method of FIG. 2, the configuration received from the network node may include (e.g., one or more of): information indicating the inband frequency resources including one or more of: a starting resource block of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of the bandwidth part; and the target extension factor for the target spectrum extension. Also, for example, depending on the scenario, some of the configuration parameters (e.g., target extension factor) may be determined from a specification or standard (e.g. in the case if only one extension factor, such as 0.25 is supported). For example, based on a standard or specification, both UE and gNB may use a preconfigured value of target extension factor (e.g., 0.25), when an extension is performed. If multiple target extension factors are possible, then control information may, for example, be used by gNB to configure UE to use one of the possible target extension factors. Or, UE may inform gNB of the target extension factor, of multiple possible target extension factors, that the UE will use to perform extension.

For the method of FIG. 2, wherein: a size (M) of the set of inband frequency resources may include a number (M) of occupied resource elements or subcarriers after a Discrete Fourier Transform (DFT) block, wherein the number (M) of resource elements or subcarriers of the inband frequency resources are an integer number of 12 resource elements or subcarriers, wherein a resource block comprises 12 resource elements or subcarriers; a size of the total allocation (Q) of frequency resources comprises a sum of resource elements for the inband frequency resources and the excess band frequency resources for the target spectrum extension; and a size of the excess band frequency resources for the target spectrum extension based on the target extension factor comprises a number of resource elements of (Q–M), wherein the size of the excess band frequency resources comprises a difference between the size of the total allocation (Q) and the number (M) of resource elements or subcarriers of the inband frequency resources.

For the method of FIG. 2, the determining, by the user device based on the set of inband frequency resources and the target extension factor, the excess band frequency resources for the spectrum extension and/or a total allocation of frequency resources for uplink transmission may include determining at least one of the following: a number of resource elements for the total allocation=[(a number of resource elements for the set of inband frequency resources)/(1−the target extension factor)]; a number of resource elements for excess band allocation=[[(a number of resource elements for the set of inband frequency resources)*the target extension factor/(1−the target extension factor)]; and/ or a number of resource elements for the set of inband frequency resources=[(the number of resource elements for the total allocation)*(1−the target extension factor)].

For the method of FIG. 2, wherein if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the method further comprises performing at least one of the following: treating or applying the one or more orphan resource elements as guard band or unused resource elements; rounding up or down, the excess band based on the target extension factor that includes a fractional resource block to a nearest integer number of resource blocks; rounding up or down, the total allocation of frequency resources based on the target extension factor that includes a fractional resource block to a nearest integer number of resource blocks; and/or considering or determining sizes of the excess band for the target spectrum extension that result in an excess band or total allocation that include a fractional resource block as being an invalid resource allocation from the network node.

For the method of FIG. 2, wherein the performing a spectrum extension may include performing a symmetric extension to the inband frequency resources by appending a first half of the excess band frequency resources to an upper end of the inband frequency resources and appending a second half of the excess band frequency resources to a lower end of the inband frequency resources; the method may further include: determining, by the user device, that the excess band frequency resources include an odd number of resource blocks or one or more orphan resource elements that are part of a fractional resource block; and shifting, by the user device, the total allocation including the inband frequency resources and the first half and the second half of the excess band frequency resources, by one half of a resource block in the frequency domain so that the resource blocks of the total allocation are resource block aligned with a grid of resource blocks.

For the method of FIG. 2, the method may further include determining, by the user device, that the excess band frequency resources include an odd number of resource blocks or one or more orphan resource elements that are part of a fractional resource block; and shifting, by the user device, the total allocation including the inband frequency resources and the first half and the second half of the excess band frequency resources, by one half of a resource block in the frequency domain so that the resource blocks of the total allocation are resource block aligned with a grid of resource blocks.

Figure 3:
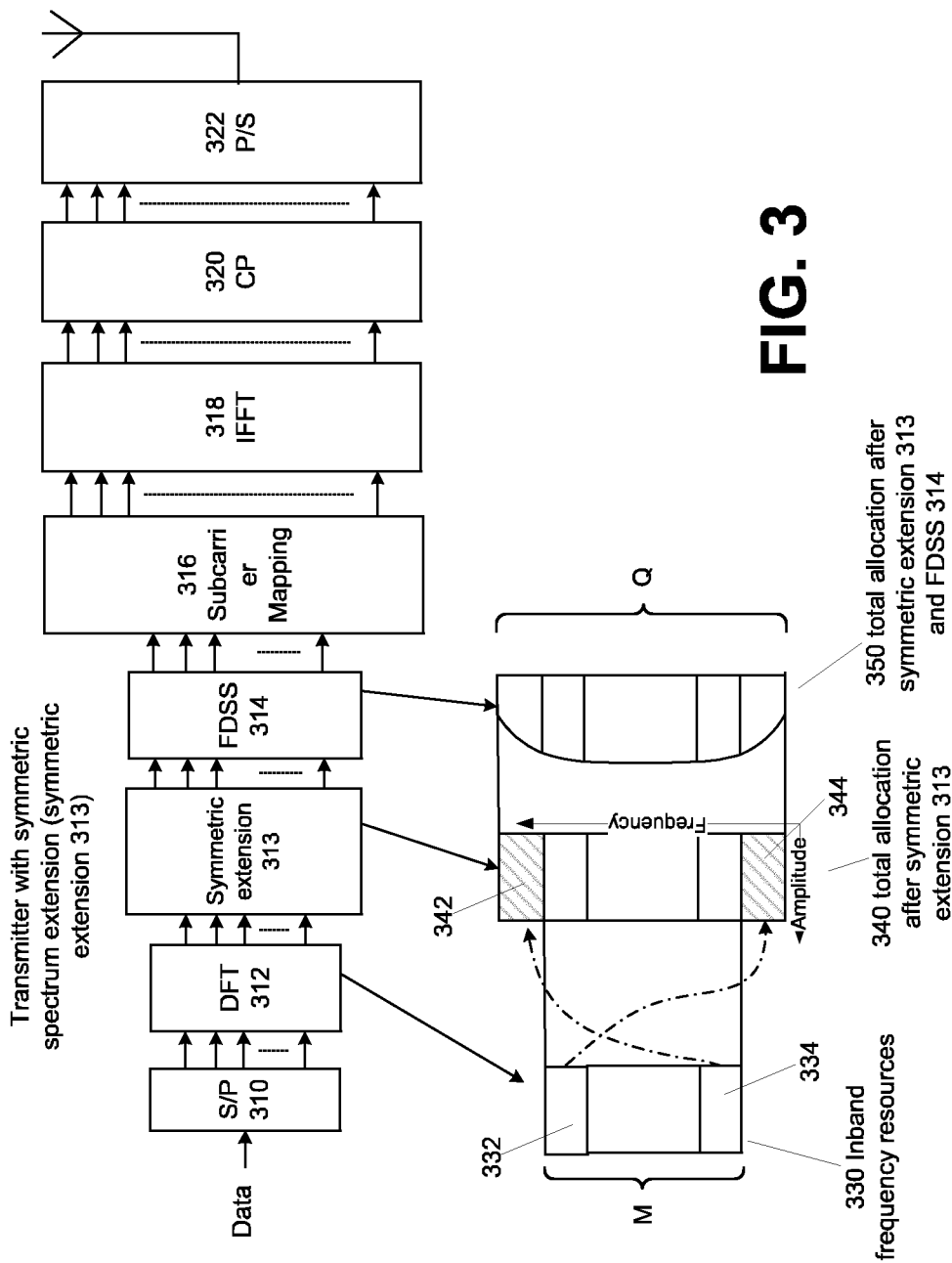
FIG. 3 is a block diagram of a transmitter with a spectrum extension according to an example embodiment.

FIG. 3 is a block diagram of a transmitter with a spectrum extension according to an example embodiment. Data (e.g., bi-phase shift keying, BPSK data, or QPSK data, which, for example, may have been phase rotated by Pi/2, or other data,) may be input to a serial-to-parallel converter 310, where serial data stream is converted to parallel output. A Discrete Fourier Transform (DFT) block 312 performs a discrete Fourier transform on the parallel data to output frequency domain values. For example, M may follow the existing DFT size rule: e.g., where M should be expressed as multiple of $2^a*3^b*5^c$, where [a, b, c] are integers$\geq 0$.

As shown in FIG. 3, a symmetric extension block 313 may perform a symmetric extension on the frequency domain values output by the DFT block 312, in order to perform a spectrum extension. As noted, spectrum extension may be performed to reduce PAPR of a signal. Spectrum extension may extend or increase the spectrum or range of frequencies of a signal, and thereby reduce PAPR of the signal. In general, a spectrum extension may involve copying a portion of outputs (such as frequency domain values output by a DFT block, or output by a previous block) and appending those frequency domain values to the beginning and/or end of the outputs, which results in adding additional frequency domain values or excess (or additional) frequency bands (or resource elements or subcarriers). For example, symmetric extension may be performed by copying a lower frequency part after the DFT output and paste it next to the upper frequency part of the DFT output, and by copying an upper frequency part after the DFT output and paste it next to the lower frequency part of the DFT output.

A frequency domain spectrum shaper 314 (implemented in this illustrative example in the frequency domain), may perform frequency domain spectrum shaping on the frequency domain values, e.g., which may reduce PAPR. Spectrum shaped outputs from the FDSS 314 are input to a subcarrier mapping block 316, where spectrum shaped outputs are mapped to subcarriers of a signal to be transmitted (still in the frequency domain). At Inverse Fast Fourier Transform (IFFT) block 318, the outputs of block 316 are converted to time domain values via a IFFT process. A cyclic prefix (CP) is added to the time domain signal at cyclic prefix (CP) block 320. The signal output from block 320 is then converted from parallel to serial format via parallel-to-serial (P/S) block 322, and then is transmitted via an antenna.

An example process of performing a symmetric extension will be described in more detail with reference to FIG. 3, according to an illustrative example. According to an example embodiment, outputs of DFT block 312 are (or may include) inband frequency resources 330, which have been allocated by a gNB or network node to a UE for uplink transmission. For example, the inband frequency resources 330 may include M resource elements or subcarriers. For example, the gNB may allocated 5 resource blocks (RBs) to the UE as inband frequency resources, e.g., where each resource block (RB) (which may also be referred to as a physical resource block or PRB) may include 12 resource elements or subcarriers. Thus, in this example, 60 resource elements or subcarriers (e.g., M=60 resource elements or subcarriers may be allocated to the UE as inband frequency resources for uplink transmission).

As shown in FIG. 3, inband frequency resources (M resource elements or subcarriers), may be extended via symmetric extension 313 block to add a spectrum extension (including upper extension block 342, and lower extension block 344). The M inband frequency resource elements may be extended by (M-Q) resource elements to produce a total allocation of Q resource elements. For example, M=72 resource elements (e.g., 6 RBs) may be extended by 24 resource elements (or 2RBs, for example, which is the size or number of excess band frequency resource elements for the spectrum extension) to obtain a total allocation of 96 resource elements (or 8 RBs), by way of illustrative example. Thus, after symmetric extension by block 313, the UE has a total allocation 340 of Q resource elements or subcarriers (e.g., Q=96 resource elements or subcarriers). The FDSS block 314 may perform spectrum shaping on the total allocation 340 of frequency resources to output a spectrum extended and spectrum shaped output of the total allocation at 350, which is input to subcarrier mapping block 316. Or, if there is no spectrum shaping (e.g., there is not FDSS block 314), the spectrum extended output of block 313 may be input to subcarrier mapping block 316.

The transmitter of FIG. 3 may be or may include a DFT-S-OFDM (discrete Fourier Transform-spread—orthogonal frequency division multiplexing) transmitter with FDSS and spectrum extension. The symmetric extension block results in a total allocation to the UE that includes excess bands (Q–M). The FDSS block with band bins are weighted by the FDSS function before mapping to the IFFT input. FDSS with symmetric spectrum extension may, at least in some cases, provide up to a 2 dB improvement for uplink coverage with QPSK modulation.

In addition to receiving information from a gNB indicating a set of inband frequency resources, the UE may also receive information from the gNB or network node indicating excess band frequency resources for a spectrum extension (or information that the UE may use to determine such excess band frequency resources, such as information indicating a quantity or number of resource elements for the excess band or spectrum extension). For example, the gNB may send information to the UE indicating inband frequency resources of 72 resource elements or subcarriers (6 RBs) (e.g., information indicating a start and stop RBs of the inband frequency resources), and information indicating a excess band size of 24 resource elements or subcarriers (2 RBs) that should be provided as a spectrum extension to the inband frequency resources. These values are merely examples, and other numbers of inband frequency resources and/or extension band frequency resources may be used.

For example, the UE may receive a configuration from the gNB which may include information indicating the inband frequency resources (e.g., such as start and/or stop RBs, and/or inband frequency resource size) and indicating the excess band frequency resources (or size of such excess band frequency resources) to be used or provided as a spectrum extension). For example, such configuration from the gNB may include information indicating the inband frequency resources including one or more of: a starting resource block (starting RB) of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of the bandwidth part; and a target extension factor for the target spectrum extension. The target extension factor may indicate a target size or amount (or number) of frequency resources (e.g., number or quantity of RBs, subcarriers or resource elements), which may be expressed, for example, as a percentage of the total allocation of frequency resources (Q). For example, a target extension factor of 0.25 (or 25%) may indicate that 25% of the total allocation of frequency resources (e.g., total allocation of resource elements or subcarriers) allocated to the UE is (or will be used as) excess band frequency resources (or spectrum extension). For example, an inband frequency size of 60 resource elements, and a target extension factor of 0.25 (or 25%) indicates that a target excess band size or target spectrum extension will be 80 resource elements (e.g., 0.25*80 REs=20 REs). Also, for example, the UE may receive a frequency domain resource allocation (FDRA) for inband explicitly (e.g., via uplink grant). In addition, the UE may receive or may determine the target extension factor. Based on this information, the UE can determine the excess band size and location implicitly (e.g., without explicit indication from network).

Also, as described in greater detail below, for example, a target extension (or target spectrum extension) based on a target extension factor, may be the same as or different from the actual spectrum extension, e.g., since a UE may round the number of resource elements for the spectrum extension or round the number of resource elements for the total allocation up or down to a nearest integer number of resource blocks (RBs). For example, the UE may round up or down, the total allocation of frequency resources e.g., total allocation of resource elements or subcarriers) based on a target extension factor that may result in a fractional resource block (where a RB may include 12 resource elements/subcarriers, for example) to a nearest integer number of resource blocks, e.g., if a size of the excess band frequency resources, based on the target extension factor for the target spectrum extension, is not an integer number of a resource block of resource elements, and/or which results in a total allocation including one or more orphan resource elements (or orphan subcarriers) that are part of a fractional resource block or are not part of an integer multiple of resource elements. Orphan resource elements may include resource elements or subcarriers that are beyond or not part of an integer number of resource blocks. For example, if a resource block includes 12 resource elements, and a total allocation of 68 resource elements (resource elements of 5 RBs, plus 8 additional resource elements/subcarriers) is provided to the UE, the last 8 resource elements (e.g., resource elements beyond the 5 RBs), which do not make up a whole RB or are considered a fractional RB, may be considered orphan resource elements, for example.

A gNB may indicate or signal to the UE information indicating set of inband frequency resources (e.g., such as information indicating a start and stop PRBs for the inband frequency resources) and the target extension factor. The UE may then be able (or be enabled) to determine at least one of the following: a number of resource elements for the total allocation=[(a number of resource elements for the set of inband frequency resources)/(1−the target extension factor)]; a number of resource elements for excess band allocation=[[(a number of resource elements for the set of inband frequency resources)*the target extension factor/(1−the target extension factor)]; and/or a number of resource elements for the set of inband frequency resources=[(the number of resource elements for the total allocation)*(1−the target extension factor)].

As shown in the illustrative example of FIG. 3, the UE (or symmetric extension block 313 of the UE) may perform a symmetric extension, e.g., based on the M inband frequency resources and an indicated or signaled target extension factor (e.g., target extension factor=0.25, or 0.33, as examples). For example, the UE or the symmetric extension block 313 (FIG. 3) may perform a symmetric extension to the M inband frequency resources 330 by: 1) appending a number of lowest (or lower portion 334 of) inband frequency resources to the excess band frequency resources adjacent to the highest inband frequency resources 330 (e.g., by appending lower portion 334 of inband resources adjacent to highest inband frequency resources, as upper extension block 342), and 2) appending a number of highest (or highest frequency) (or upper portion 332 of) inband frequency resources 330 to the excess band frequency resources adjacent to the lowest (or lowest frequency) inband frequency resources (e.g., by appending upper portion 334 of inband resources adjacent to lowest inband frequency resources, as lower extension block 344). For example, inband frequency resources 330 of 5 RBs may be allocated to UE, and target extension is indicated that results in a spectrum extension of 2 RBs. Thus, a lower portion (or lowest frequency portion) (1 RB) 334 of inband frequency resources 330 may be appended to inband frequency resources 330 as upper extension block 342, and an upper (or highest frequency) portion (1 RB) 332 of inband frequency resources 330 may be appended to inband frequency resources 330 as upper extension block 342. Thus, 1 RB may be appended to both an upper and lower edges of the inband frequency resources 330, resulting in a symmetric extension (e.g., extension is provided of 1RB to each edge of the inband frequency resources). Thus, for example, the excess band frequency resources or spectrum extension may include, e.g., a first half (342) of the excess band frequency resources (or first half of the spectrum extension) appended to an upper end (or appended to an upper frequency edge) of the inband frequency resources 330, and a second half (344) of the excess band frequency resources (or second half of the spectrum extension) appended to a lower end (or appended to a lower frequency edge) of the inband frequency resources 330. This is merely an illustrative example, and other types of spectrum extensions may be performed as well.

In order to have the same notation between different vendors or UE equipment manufacturers, the spectrum extension may be defined in the same way, e.g., to allow interoperability between UEs and gNBs of different manufacturers/vendors. Some parameters may be used, by way of example:

Inband size: Occupied REs (occupied resource elements or subcarriers) after DFT-block, M in FIG. 3.

Excess band size: The amount of spectrum extension, (Q−M) in FIG. 3.

Total allocation size (Inband size+Excess band size): Occupied REs after symmetric extension block 313, Q in FIG. 3.

The amount or size of the spectrum extension or size of the excess frequency resources may be defined or determined based on a target extension factor (or an extension factor) (a), e.g., which may be defined as:

Target extension factor or (a)=Excess band size/Total allocation size.

With respect to inband size, the current DFT size limitations may be maintained or required, which may have been defined for DFT-s-OFDM already for LTE and NR Rel-15. Based on that, for example, DFT size should (in an example embodiment) be expressed as multiple of $2^a * 3^b * 5^c$, where [a, b, c] are integers≥0. This would mean that FDSS with spectrum extension does not require new DFT size options compared to legacy.

Also, for example, depending on the inband size and extension factor (α), the total allocation size allocation size may or may not be a multiple of 12 REs (may or may not be an integer multiple of a RB).

Example

α=0.25 (target extension factor)
Inband size: 60 REs (5 RBs)
Excess band size: 20 REs (1.67 RBs)
Total allocation: 6.67 RBs In this example, the total allocation size is not an integer multiple of 1 RB. In this example, the size of the excess band frequency resources (and/or the size of the total allocation), based on the target extension factor for the target spectrum extension, is not an integer number of a resource block of resource elements, resulting in a total allocation that includes one or more orphan resource elements that are part of a fractional resource block or are not part of an integer multiple of resource elements.

Another issue may arise, such as if the excess band frequency resources do not fit within a current uplink bandwidth part or carrier for the user device/UE to perform uplink transmission.

Therefore, for example, there may be various ways for a UE and/or gNB to handle this situation, e.g., with orphan resource elements or where a total allocation that includes a fractional RB, or where excess band frequency resources do not fit within current uplink bandwidth part or carrier. For example, if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the resource elements may be handled or considered as follows (several possibilities): treat the one or more orphan resource elements as guard band or unused resource elements; round up or down, the excess band based on the target extension factor that includes a fractional resource block to a nearest integer number of resource blocks; round up or down, the total allocation of frequency resources based on the target extension factor that includes a fractional resource block to a nearest integer number of resource blocks; consider or determine sizes of the excess band for the target spectrum extension that result in an excess band or total allocation that include a fractional resource block as being an invalid resource allocation from the network node.

For example, a ceiling (rounding up) towards the next full RB may not be (at least in some cases) preferred since it may complicate the FDSS filter design (basically it will introduce a new Extension factor). Instead, other options may be better, and thus, the following may be performed, according to example embodiments: Consider orphan REs as guard band (unused band), where orphan REs (resource elements from 6.67 to 7 RBs, maybe 2 REs on each side of inband frequency resources) are not part of inband or excess band allocation, and will be unused and considered guard band, to simplify FDSS design, for example.

Therefore, depending on how orphan resource elements (or fractional PRBs) are handled as part of a total allocation to a UE for uplink transmission, the actual extension factor (e.g., the number of actual excess band resource elements (of the actual spectrum extension) divided by the total number of resource elements of the total allocation) may be the same as or may be different from the target extension factor (the number of target excess band resources (of the target spectrum extension) divided by the total allocation of resource elements). This is because, the UE may, e.g., round the total allocation of resource elements (e.g., if a non-integer number of resource blocks) either up or down to the closest integer multiple of PRBs (e.g., multiple of 12 resource elements), or the orphan resource elements (e.g., in this case the resource elements of the 0.67 RB, which would be about 8 resource elements, based on 1 RB including 12 resource elements) may be discarded or used as guard band and thus not considered part of the excess band or total allocation. For example, the total allocation of the 6.67 RBs may be rounded up to 7 RBs, or rounded down to 6 RBs, or the 0.67 RBs (e.g., 8 resource elements, which are orphans or part of a fractional RB for the total allocation or part of the excess bands or spectrum extension) may be used as guard band resource elements, and thus not used as part of the excess band frequency resources or the total allocation.

Also, according to another example embodiment, inband size allocations and/or excess band allocations (and/or target extension factors) that result in fractional PRB allocations, may be considered as invalid allocations, e.g., and may thus be ignored by the UE, or may not be allocated by the gNB.

Various options may be used to handle these situations of a total allocation that may include fractional PRB, or where excess band may not fit within bandwidth part or carrier for uplink transmission, including: treat the one or more orphan resource elements as guard band or unused resource elements; round up or down, the excess band based on the target extension factor that includes a fractional resource block to a nearest integer number of resource blocks; round up or down, the total allocation of frequency resources based on the target extension factor that includes a fractional resource block to a nearest integer number of resource blocks; consider or determine sizes of the excess band for the target spectrum extension that result in an excess band or total allocation that include a fractional resource block as being an invalid resource allocation from the network node.

Figure 4:
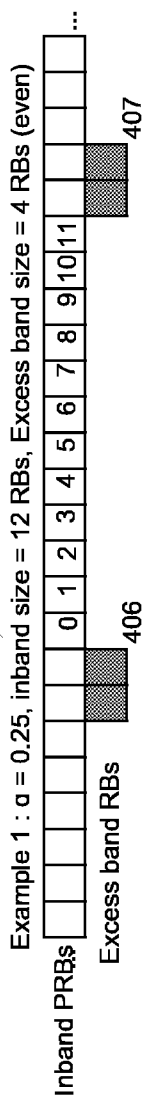
FIG. 4 is a diagram illustrating shifting of inband frequency resources by a fraction of a resource block according to an example embodiment.
Figure 4:
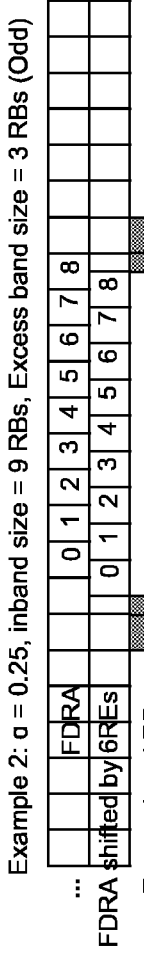

FIG. 4 is a diagram illustrating shifting of inband frequency resources by a fraction of a resource block according to an example embodiment. Frequency domain resource allocations (FDRA) are shown, including allocations of RBs to the UE for uplink transmission, e.g., including inband and excess band allocations (together these make up the total allocation to the UE). As noted, the target extension factor may be used by a UE to determine the excess band frequency resources. In example 1, shown in FIG. 4, a target extension factor of 0.25 and an inband frequency resources of 12 RBs is indicated to the UE. Thus, in this example, based on this information, the UE may determine that an excess band of 4 RBs (which is an even number of RBs) is allocated to the UE. Thus, the UE may provide a symmetric extension (or excess band) of 4 RBs, including 2 PRBs (at 407) provided at an upper extension block or appended to an upper end of the inband frequency resources, and 2 RBs (at 406) provided at a lower extension block or appended to a lower frequency range of the inband frequency resources. In an example embodiment, the total allocation (including inband RBs and excess band RBs) should be aligned with a RB grid or expected or required frequency alignment of RBs (e.g., start of each RB should be aligned to specific groups of 12 resource elements or subcarriers). There is no resource block alignment issue in example 1 because the excess band or spectrum extension in example 1 includes an even number of RBs, allowing an integer number of RBs to be allocated to both the upper extension block and the lower extension block of the excess band or spectrum extension. Thus, at 410 of FIG. 4, in case of an excess band size that is an even number of RBs (which may also include possible fractional RBs on both excess bands, i.e., on both ends of the total allocation), there is no need to shift RBs of the total allocation since the RBs are already RB grid aligned.

However, as illustrated in example 2 of FIG. 4, a RB misalignment may (e.g., typically) occur when an odd number of RBs are allocated or determined as the excess band or spectrum extension. An odd number of excess band RBs may or may not contain fractional RBs (i.e., orphan REs). As shown in example 2 of FIG. 4, 3 RBs are determined as the total excess band or spectrum extension, which means that each of the upper extension block 422 and the lower extension block 420 of the excess band RBs includes 1.5 (or 1½) RBs, leaving an edge of the upper and lower extension blocks (420, 422) at a fractional RB point, which may not be permitted, e.g., in the likely case where RBs of the allocation (inband and excess band allocations) should begin and end at expected RB boundaries, e.g., which may be defined by the RB grid. Thus, in this example 2, at 424, in case of excess band that is an odd number of RBs (or includes a fractional RB, such as ½ or ⅓ of an RB), the UE may shift the total allocation (including inband and excess band/spectrum extension RBs) by a fraction of a RB (e.g., by ½ RB in this example 2 of FIG. 4) so that the RBs of the total allocation will be properly RB aligned with expected RB boundaries or aligned with a RB grid. Thus, the UE may shift the total allocation including the inband frequency resources and the first half (e.g., 420) and the second half (e.g., 422) of the excess band frequency resources, by one half (or other fraction) of a resource block in the frequency domain so that the resource blocks of the total allocation are resource block aligned with a grid (or required frequency resource alignment) of resource blocks. Also, the total allocation shift may be performed downwards (as in FIG. 4), or upwards (not shown). Both UE and gNB may typically perform the same shift in same direction. This amount of shift and/or direction of shift can be defined in the standard or specification, known and used by both UE and gNB, for example (i.e., it does not require additional signalling).

Figure 5:
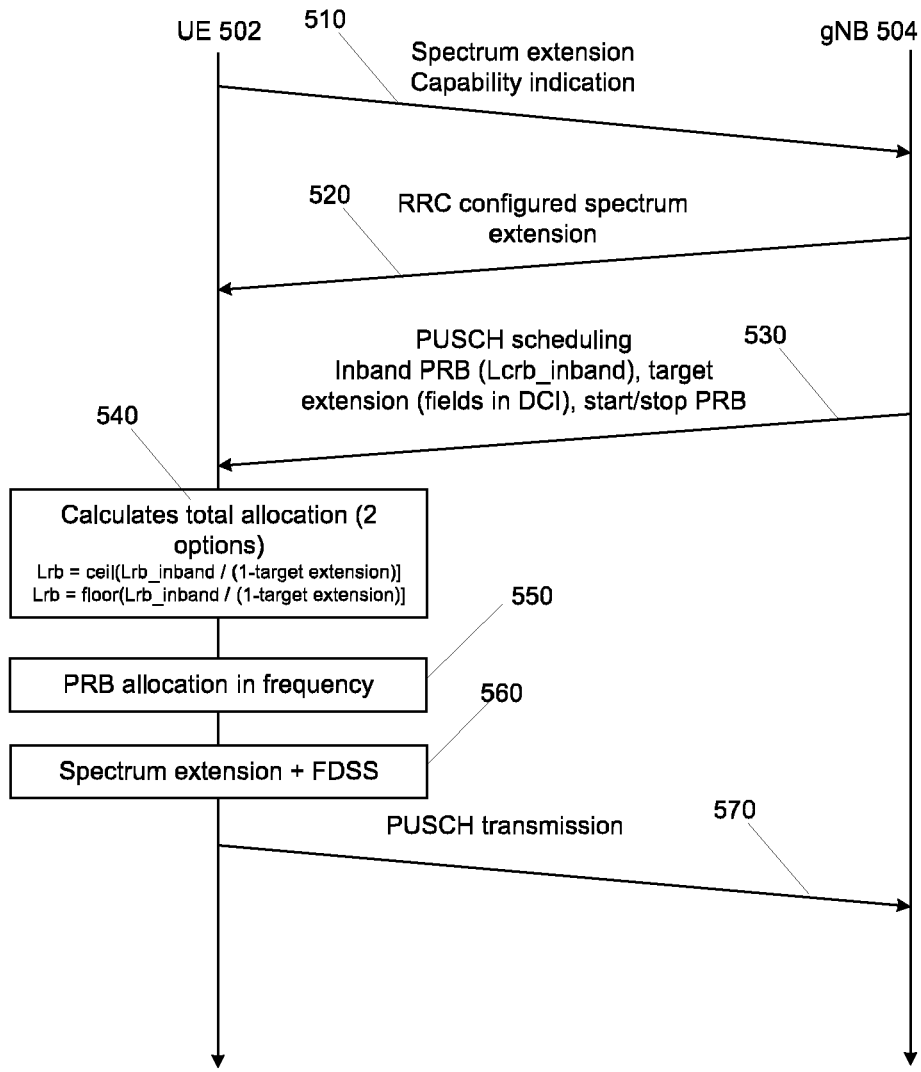
FIG. 5 is a diagram illustrating operation of a UE or user device according to an example embodiment.

FIG. 5 is a diagram illustrating operation of a UE or user device according to an example embodiment. At 510, the UE 502 may exchange capabilities with gNB 504, or otherwise may indicate one or more of its capabilities to gnB 504, including that UE 502 is capable of performing a spectrum extension (or capable of performing FDSS and spectrum extension). At 520, the UE 502 may receive a configuration (e.g., via radio resource control (RRC) message or other message) including at least an indication to perform spectrum extension for the allocation for uplink transmission. At 530, the UE may receive a PUSCH (or uplink data transmission) configuration or allocation, including, e.g., an indication of start PRB and end PRB of inband frequency resources and an indication of a target extension (e.g., 0.25 or 0.33) to be used to determine the target excess band frequency resources (or for the UE to determine the quantity or number of PRBs for the target excess band or target spectrum extension). This information (allocation or grant for uplink transmission via physical uplink shared channel) may be communicated by the gNB to the UE via downlink control information (DCI) of PDCCH (physical downlink control channel) or MAC control element, or other message or control information. At 540, the UE 502 may determine the total allocation, including determine the inband frequency resources and the excess band frequency resources (and spectrum extension). At 550, the UE 502 determines the resource elements or subcarriers for the inband and excess band RBs (including spectrum extension). The UE may, e.g., round up or down the excess band or spectrum extension to an integer number of PRBs, or may disregard or not use (or consider as guard band) any orphan resource elements or fractional RBs, and/or may shift a total allocation by a RB fraction, as described above, if necessary, and if performed/implemented by the UE 502. Thus, at 540 and 550, the UE may determine, based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources. At 560, the UE 502 may perform (or add) the spectrum extension, and/or perform spectrum extension and FDSS, as described hereinabove. At 570, the UE may transmit a spectrum extended signal (or a spectrum extended and FDSS shaped signal).

Various example embodiments relate to adaptive coverage extension for spectrally shaped waveforms. Techniques are described for the UE to determine the spectral extension based on the signalled parameters between gNB and UE, and how to define extension for different RB sizes according to DFT size available based on legacy system, and/or based on other parameters or information that may be provided/signaled by gNB or known by UE. For example, the UE may be preconfigured with one or more (target) extensions (or target extension values) (e.g., via RRC). DCI may be used to select one target extension (or legacy operation) for current transmission by UE.

Based on the selected target extension and frequency domain resource allocation, UE may select actual extension the corresponding allocation for inband and excess band REs (resource elements).

In an example embodiment, UE may not use exactly the signalled extension (but defines guard REs according to the defined procedure)

In an example embodiment, the UE may receive inband RBs (e.g., information indicating start/stop RBs of inband allocation) and target extension from gNB.

The target extension may be, e.g., the amount of extension in percentage value compared to the total allocation (inband+excess band). For example, a new or an existing field in DCI (included by gNB within PDCCH) may be used to control or indicate parameters of the spectrum extension (e.g., to indicate target extension factor). For example, DCI (downlink control information sent to UE may include, e.g.:
 1 bit to indicate either: spectrum extension OFF (target extension=0), RRC configured extension #1; or
 2 bits to indicate one of: spectrum extension OFF (target extension=0), RRC configured extension #1, RRC configured extension #2, RRC configured extension #3.

In another example embodiment, target extension may be configured separately for outer and inner allocations. The configuration can be made via RRC.

A benefit of this approach is that it may allow improvement and/or possibly optimization of the amount of extension (& FDSS filter separately) for each RB region (inner, outer, edge), because the gain depends on the allocation region. RB region is the location of the allocated REs in the channel bandwidth, e.g., whether the RB is located in the center of the band, or at the edge of the band.

In an example embodiment, RB regions may be configured via RRC by means of RB_start_low (or RB_start_high) and/or allocation size.

These parameters may be used by the UE to calculate the total allocation as follows, for example: (note, as used herein, resource blocks (RBs) and physical resource blocks (PRBs) are different terms for the same blocks of resources, e.g., 1 RB=12 resource elements or subcarriers).

The total allocation (inband+excess band)=inband RBs/(1−target extension). As noted, in some cases, the total allocation may include a fractional RB or orphan resource elements (REs). UE may round (e.g., either round up via ceiling operation, or round down via floor operation, depending on implementation) the resulting total allocation to the next full RBs (ceil/floor-operation) (one option to select between the ceil or floor operation could be configured via RRC). In one example embodiment: the UE may round up the resulting total allocation of RBs via ceil operation (→target extension is a lower limit in this case). In another embodiment the UE may round down the total allocation of RBs via floor operation (→target extension is an upper limit in this case).

RB allocation in frequency. Resource allocation may include RB allocation (start/stop RBs) as in the legacy (assuming no FDSS w/spectrum extension).

Total allocation $T_{startPRB}$ starts from the indicated start-PRB−ceil(excess band in PRBs/2);

Inband starts from the 12*[$T_{startPRB}$+floor(excess band in PRBs/2)]+c, where c=0 if excess band in PRBs is even, and c=6 if excess band in PRBs is odd.

Note that depending on the embodiment, the actual amount of spectrum extension might be left to UE choice, which may provide the UE with flexibility.

According to an example embodiment, 25% (or 0.25) for a target extension factor (or target extension) may be a good value to provide a large or improved coverage (net) gains. However, in some cases, several inband sizes may not be able to support 25% extension directly. Therefore, at least in some cases, a rounding operation (rounding up or down of non-integer number of RBs for total allocation), and the rules to allocate the transmission in the frequency resources may be useful or needed.

In an example embodiment, the UE is not allowed to use subcarriers outside the "target extension factor" or outside of the target spectrum extension. The total allocation (inband+excess band) in subcarriers=floor (12*inband PRBs/(1−target extension)) or ceil (12*inband PRBs/(1−target extension)). One goal of this embodiment would be to have similar excess band size for all UEs.

In yet another example embodiment, the total allocation may be calculated as: total allocation (inband+excess band) =inband PRBs*(1+target extension), where target extension in step 1 is defined compared to inband only (this is equivalent to defining the allocation size in terms of rolloff).

Resource allocation where inband or excess PRBs are outside the active UL BWP (active uplink bandwidth part) may be considered as invalid resource allocations (e.g., and thus, ignored by UE if received).

One or more target extensions can be configured via RRC, or they can be determined by specification.

In an example embodiment, a fixed target extension factor may be used (e.g. 0.25).

In another example embodiment, multiple fixed target extension factors may be used, where a selected one of these target extension factors may be selected or indicated by the gNB to UE via downlink control information (DCI) or other signaling or control information.

In one example embodiment, the allowed extension depends on the code rate.

In another example embodiment, fixed target extension factor values may be defined separately for different allocation types: Inner allocation, Edge allocation, Outer allocation, or based on size of allocation, or based on modulation and coding scheme (MCS). In these cases UE may determine the amount of extension from the starting RB and/or the number of RBs (Lcrb) of inband frequency resources. The allocation types may be determined in RAN4 specifications.

In another example embodiment, the UE receives total allocation (e.g., start-stop RBs for inband allocation) and target extension factor from gNB. In this case, inband size (in RBs is determined as): Inband RBs=total allocation*(1−target extension factor). The obtained value for Inband RBs may be rounded in such a way that the number of inband REs may be or becomes power of 2, 3, 5 (→Inband RBs actual). This can be rounded, e.g., to the nearest, or next higher or lower number of active RBs that satisfies the rule. The rounding operation (e.g., next higher or next lower power of 2, 3, 5 can be configured via RRC).

Excess band RBs=total allocation−Inband RBs

Total allocation starts from the signalled start RB (T_startRB)

Inband starts from the 12*[T_startRB+floor (excess band in RBs/2)]+c, where c=0 if excess band in RBs is even, and c=6 if excess band in RBs is odd.

Various example terms are described, which may be relevant to the various example embodiments.

Guard band may include or correspond to a number of unused resource elements (or RBs) around the used resource elements. This term is used with legacy (i.e. in the scenarios without spectrum extension). Guard band should not be mixed to the excess band. Guard band is used as empty to separate frequency resources (e.g., to prevent interference).

Excess band is used to enable PAPR reduction so that the resources are actually used by (or at least made available for) a UE.

Excess band: May include or may be occupied resources outside of the DFT output. The excess band may be created by symmetric extension block 313, for example.

Spectral extension: It's "symmetric extension" part of FDSS w/spectrum extension (e.g., power domain enhancement to be considered in NR Rel-18).

Target extension: The amount of extension in percentage value compared to the total bandwidth (inband+excess band). Example values for target extension are e.g., 25%, 33%. Target extension (%) can be seen also as allowed maximum (or minimum depending on the definition floor/ceil) extension permitted for the UE. But after target extension, the actual extension then depends on the number of allocated PRBs, which may be adjusted, as described herein.

Actual extension=(or is based on an) actual extension factor obtained after performing the corresponding computations or adjustments (e.g., rounding, or dropping orphan REs as guard band REs, or other adjustments) based on target extension factor and inband RBs.

Actual extension factor: The actual extension (in percentage), that varies according to the scenario. In some cases, 'actual extension factor'='actual extension'.

According to an example embodiment:

Target extension(s) may be given by RRC (and possibly with DCI). Another option is to define target extension factor(s) by specification or standard that is known and used by both UE and gNB.

For example, excess band size and/or total allocation size may be determined from Frequency domain resource allocation (e.g., by means of table or equation that may be known by both UE and gNB). Or, a signal may be transmitted from UE to gNB or from gNB to UE to indicate or identify the table or the equation that is being used by UE or should be used by UE to determine excess band size, total allocation size and/or target extension factor. For example, FDRA or UL grant may define the Inband size while a table or equation may define the excess band size and/or the total allocation size for the given target extension factor.

FIG. 7 is a diagram illustrating an example table that may be known and/or used by both UE and gNB, and shows different total allocation sizes (in RBs) for different inband allocation sizes (in RBs) and different target extension factors ($\alpha$). One example shown in the table of FIG. 7 shows that for an inband allocation size of 5 RBs, and a target extension factor of α=0.25, the total allocation size will be 6.67 RBs.

α=0.25 (target extension factor).
Inband size: 60 REs (5 RBs).
Excess band size: 20 REs (1.67 RBs).
Total allocation: 6.67 RBs.

Thus, in this manner, by both UE and gNB using the same table, an inband allocation (or inband allocation size) and a target extension factor may be signaled to the UE and/or determined by the UE, and then the UE may determine (based on this information and the table) the total allocation size for this uplink transmission to gNB. Or 2 of the 3 of these parameters may be signaled to and/or known by UE, and UE may determine the 3$^{rd}$ of these parameters from this table (e.g., may determine target extension factor based on inband allocation size and total allocation size). gNB may use same table to determine or know the same information for the uplink transmission from the UE.

In this embodiment, the excess band is expressed in full RBs, for example.

Actual extension≥target extension
Highlighted example
Inband PRBs: 45
Target Extension factor: 0.333
Excess band PRBs: 23
Total allocation 68 PRBs
Actual extension factor=0.3382 (≥0.333)
Excess band start: −11.5 RBs w.r.t RB start Thus, in an example embodiment, an excess band is not taken from guard band but it has to be deliberately allocated by the scheduler. It is part of signal RB allocation and hence may reduce the inband allocation compared to case with the same total RB allocation without extension. Despite higher code rate due to smaller inband allocation, coverage gain can still be obtained due to better signal characteristic in transmission (lower PAPR, as explained above).

The goal of the given example was to show the relationship between:

Inband size
Excess band
Amount of extension

Instead of adjusting the number of Excess band RBs there may be multiple embodiments or approaches:

One example embodiment: Signal inband RBs+indicate target extension factor, this will provide (Inband+Excess band) (e.g., UE can determine total allocation from this signaled information).

A second example embodiment: Signal (Inband+Excess band)+indicate target extension factor. This will provide Inband RBs (inband RBs can be determined from this information).

This allows to support FDSS w/spectrum extension for a wide range of PRB allocation sizes. This solutions allows for lower signalling overhead, since a set of target extensions may be standardized, say 4 (0.1, 0.15, 0.2 and 0.25), the target extension can be configured in RRC with 2 bits, and in DCI, one bit could be used to flag that the extension is going to be used. The set of rules may be standardized, which ensures that UE and gNB are aware of the position of the allocated PRBs (excess band, and inband).

Some example advantages may include, e.g.:

The solution allows to trade-off UL capacity and UL coverage according to the actual traffic conditions in the cell.
Practical and flexible method to maximize both network and UE side performance. Allows gNB to configure and/or specify specific sizes of spectrum extension, e.g., by signaling and/or using one or more possible target extension factor(s).
Signalling size facilitates efficient use of spectrum extension, or FDSS with spectrum extension.
Can be supported with current DCI formats (even without changes to DCI content)
Supports both current gNB receiver and enhanced gNB receiver.
Small specification impact (can be made on top of PUSCH Resource allocation type 1).

Example 1. An apparatus comprising: at least one processor; and at least one memory including computer program code; the at least one memory and the computer program code configured to, with the at least one processor, cause the apparatus at least to: receive, by a user device from a network node, a configuration including at least an indication to perform spectrum extension; determine, by the user device, a target extension factor for excess band frequency resources for a target spectrum extension; receive, by the user device from the network node, information indicating a set of inband frequency resources allocated to the user device for uplink transmission; determine, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources; perform, by the user device, a spectrum extension based on the excess band frequency resources for a set of frequency domain values, to obtain a spectrum extended signal; and transmit the spectrum extended signal.

Example 2. The apparatus of example 1, wherein the at least one processor and the computer program code configured to cause the apparatus to determine, by the user device, the target extension factor comprises the at least one processor and the computer program code configured to cause the apparatus to: receive, by the user device from the network node, information identifying the target extension factor for a target extension to determine the excess band frequency resources for the spectrum extension.

Example 3. The apparatus of any of examples 1-2, wherein the at least one processor and the computer program code are further configured to cause the apparatus to: transmit, by the user device to the network node, information indicating that the user device has a capability to perform spectrum extension for uplink transmission.

Example 4. The apparatus of any of claims 1-3, wherein the at least one processor and the computer program code configured to cause the apparatus to perform a spectrum extension comprises the at least one processor and the computer program code configured to cause the apparatus to: perform, by the user device, a symmetric extension to the inband frequency resources by appending a first half of the excess band frequency resources to an upper end of the inband frequency resources and appending a second half of the excess band frequency resources to a lower end of the inband frequency resources.

Example 5. The apparatus of any of examples 1-4, wherein the at least one processor and the computer program code configured to cause the apparatus to perform a spectrum extension comprises the at least one processor and the computer program code configured to cause the apparatus to: perform, by the user device, a symmetric extension to the inband frequency resources by appending a number of lowest inband frequency resources to the excess band frequency resources adjacent to the highest inband frequency resources, and appending the number of higher inband frequency resources to the excess band frequency resources adjacent to the lowest inband frequency resources.

Example 6. The apparatus of any of examples 1-5, wherein the configuration received from the network node comprises: information indicating the inband frequency resources including one or more of: a starting resource block of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of the bandwidth part; and the target extension factor for the target spectrum extension.

Example 7. The apparatus of any of examples 1-5, wherein: a size (M) of the set of inband frequency resources comprises a number (M) of occupied resource elements or subcarriers after a Discrete Fourier Transform (DFT) block, wherein the number (M) of resource elements or subcarriers of the inband frequency resources are an integer number of 12 resource elements or subcarriers, wherein a resource block comprises 12 resource elements or subcarriers; a size of the total allocation (Q) of frequency resources comprises a sum of resource elements for the inband frequency resources and the excess band frequency resources for the target spectrum extension; and a size of the excess band frequency resources for the target spectrum extension based on the target extension factor comprises a number of resource elements of (Q-M), wherein the size of the excess band frequency resources comprises a difference between the size of the total allocation (Q) and the number (M) of resource elements or subcarriers of the inband frequency resources.

Example 8. The apparatus of any of examples 1-6, wherein the at least one processor and the computer program code configured to cause the apparatus to determine, by the user device based on the set of inband frequency resources and the target extension factor, the excess band frequency resources for the spectrum extension and/or a total allocation of frequency resources for uplink transmission comprises the at least one processor and the computer program code configured to cause the apparatus to determine at least one of the following: a number of resource elements for the total allocation=[(a number of resource elements for the set of inband frequency resources)/(1−the target extension factor)]; a number of resource elements for excess band allocation=[[(a number of resource elements for the set of inband frequency resources)*the target extension factor/(1− the target extension factor)]; and/or a number of resource elements for the set of inband frequency resources=[(the number of resource elements for the total allocation)*(1−the target extension factor)].

Example 9. The apparatus of any of examples 1-8, wherein if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the at least one processor and the computer program code are further configured to cause the apparatus to perform at least one of the following: treat the one or more orphan resource elements as guard band or unused resource elements; round up or down, the excess band based on the target extension factor that includes a fractional resource block to a nearest integer number of resource blocks; round up or down, the total allocation of frequency resources based on the target extension factor that includes a fractional resource block to a nearest integer number of resource blocks; consider or determine sizes of the excess band for the target spectrum extension that result in an excess band or total allocation that include a fractional resource block as being an invalid resource allocation from the network node.

Example 10. The apparatus of any of examples 1-9, wherein the at least one processor and the computer program code configured to cause the apparatus to perform a spectrum extension comprises the at least one processor and the computer program code configured to cause the apparatus to perform a symmetric extension to the inband frequency resources by appending a first half of the excess band frequency resources to an upper end of the inband frequency resources and appending a second half of the excess band frequency resources to a lower end of the inband frequency resources; the at least one processor and the computer program code are further configured to cause the apparatus to: determine, by the user device, that the excess band frequency resources include an odd number of resource blocks or one or more orphan resource elements that are part of a fractional resource block; and shift, by the user device, the total allocation including the inband frequency resources and the first half and the second half of the excess band frequency resources, by one half of a resource block in the frequency domain so that the resource blocks of the total allocation are resource block aligned with a grid of resource blocks.

Example 11. The apparatus of any of examples 1-9, wherein the at least one processor and the computer program code are further configured to cause the apparatus to: determine, by the user device, that the excess band frequency resources include an odd number of resource blocks or one or more orphan resource elements that are part of a fractional resource block; and shift, by the user device, the total allocation including the inband frequency resources and the first half and the second half of the excess band frequency resources, by one half of a resource block in the frequency domain so that the resource blocks of the total allocation are resource block aligned with a grid of resource blocks.

Example 12. A method comprising: receiving, by a user device from a network node, a configuration including at least an indication to perform spectrum extension; determining, by the user device, a target extension factor for excess band frequency resources for a target spectrum extension; receiving, by the user device from the network node, information indicating a set of inband frequency resources allocated to the user device for uplink transmission; determining, by the user device based on the set of inband frequency resources and the target extension factor, the excess band frequency resources for the spectrum extension and/or a total allocation of frequency resources for uplink transmission, wherein the total allocation of frequency resources includes the inband frequency resources and the excess band frequency resources; performing, by the user device, a spectrum extension based on the excess band frequency resources for a set of frequency domain values, to obtain a spectrum extended signal; and transmitting the spectrum extended signal.

Example 13. The method of example 12, wherein determining, by the user device, the target extension factor comprises: receiving by the user device from the network node, information identifying the target extension factor for a target extension to determine the excess band frequency resources for the spectrum extension.

Example 14. The method of any of examples 12-13, further comprising: transmitting, by the user device to the network node, information indicating that the user device has a capability to perform spectrum extension for uplink transmission.

Example 15. The method of any of examples 12-14, wherein the performing a spectrum extension comprises: performing, by the user device, a symmetric extension to the inband frequency resources by appending a first half of the excess band frequency resources to an upper end of the inband frequency resources and appending a second half of the excess band frequency resources to a lower end of the inband frequency resources.

Example 16. The method of any of examples 12-15, wherein the performing a spectrum extension comprises: performing, by the user device, a symmetric extension to the inband frequency resources by appending a number of lowest inband frequency resources to the excess band frequency resources adjacent to the highest inband frequency resources, and appending the number of higher inband frequency resources to the excess band frequency resources adjacent to the lowest inband frequency resources.

Example 17. The method of any of examples 12-16 wherein the configuration received from the network node comprises: information indicating the inband frequency resources including one or more of: a starting resource block of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of the bandwidth part; and the target extension factor for the target spectrum extension.

Example 18. The method of any of examples 12-17, wherein: a size (M) of the set of inband frequency resources comprises a number (M) of occupied resource elements or subcarriers after a Discrete Fourier Transform (DFT) block, wherein the number (M) of resource elements or subcarriers of the inband frequency resources are an integer number of 12 resource elements or subcarriers, wherein a resource block comprises 12 resource elements or subcarriers; a size of the total allocation (Q) of frequency resources comprises a sum of resource elements for the inband frequency resources and the excess band frequency resources for the target spectrum extension; and a size of the excess band frequency resources for the target spectrum extension based on the target extension factor comprises a number of resource elements of (Q−M), wherein the size of the excess band frequency resources comprises a difference between the size of the total allocation (Q) and the number (M) of resource elements or subcarriers of the inband frequency resources.

Example 19. The method of any of examples 12-18, wherein the determining, by the user device based on the set of inband frequency resources and the target extension factor, the excess band frequency resources for the spectrum extension and/or a total allocation of frequency resources for uplink transmission comprises determining at least one of the following: a number of resource elements for the total allocation=[(a number of resource elements for the set of inband frequency resources)/(1−the target extension factor)]; a number of resource elements for excess band allocation=[[(a number of resource elements for the set of inband frequency resources)*the target extension factor/(1−the target extension factor)]; and/or a number of resource elements for the set of inband frequency resources=[(the number of resource elements for the total allocation)*(1−the target extension factor)].

Example 20. The method of any of examples 12-19, wherein if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the method further comprises performing at least one of the following: treating or applying the one or more orphan resource elements as guard band or unused resource elements; rounding up or down, the excess band based on the target extension factor that includes a fractional resource block to a nearest integer number of resource blocks; rounding up or down, the total allocation of frequency resources based on the target extension factor that includes a fractional resource block to a nearest integer number of resource blocks; and/or considering or determining sizes of the excess band for the target spectrum extension that result in an excess band or total allocation that include a fractional resource block as being an invalid resource allocation from the network node.

Example 21. The method of any of examples 12-20, wherein the performing a spectrum extension comprises performing a symmetric extension to the inband frequency resources by appending a first half of the excess band frequency resources to an upper end of the inband frequency resources and appending a second half of the excess band frequency resources to a lower end of the inband frequency resources; the method further comprising: determining, by the user device, that the excess band frequency resources include an odd number of resource blocks or one or more orphan resource elements that are part of a fractional resource block; and shifting, by the user device, the total allocation including the inband frequency resources and the first half and the second half of the excess band frequency resources, by one half of a resource block in the frequency domain so that the resource blocks of the total allocation are resource block aligned with a grid of resource blocks.

Example 22. The method of any of examples 12-21, further comprising: determining, by the user device, that the excess band frequency resources include an odd number of resource blocks or one or more orphan resource elements that are part of a fractional resource block; and shifting, by the user device, the total allocation including the inband frequency resources and the first half and the second half of the excess band frequency resources, by one half of a resource block in the frequency domain so that the resource blocks of the total allocation are resource block aligned with a grid of resource blocks.

Example 23. A non-transitory computer-readable storage medium comprising instructions stored thereon that, when executed by at least one processor, are configured to cause a computing system to perform the method of any of examples 12-22.

Example 24. An apparatus comprising means for performing the method of any of examples 12-22.

Figure 6:
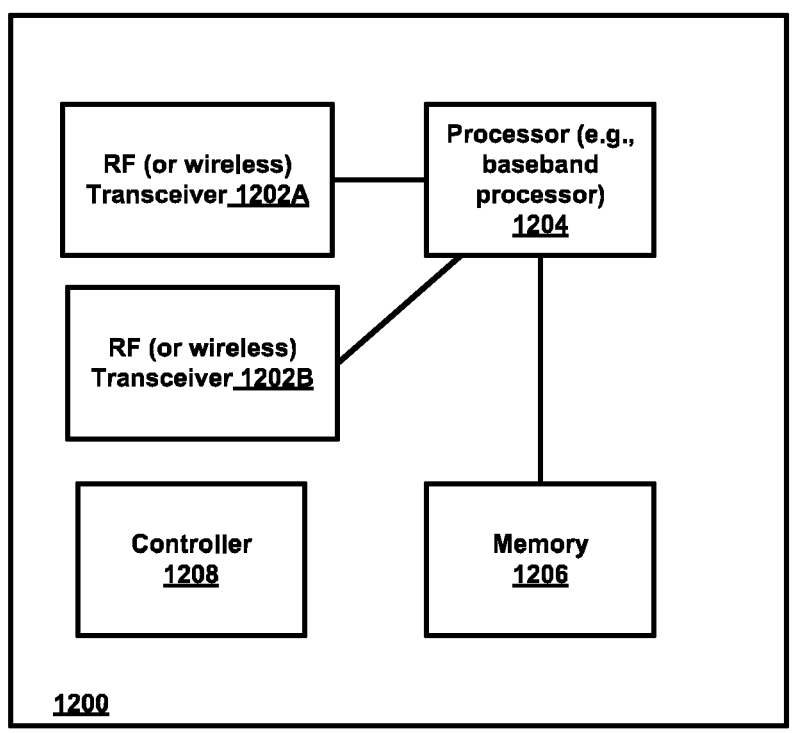
FIG. 6 is a block diagram of a wireless station, network node or wireless node (e.g., AP, BS, RAN node, UE or user device, or other wireless node or network node) according to an example embodiment.

FIG. 6 is a block diagram of a wireless station (e.g., AP, BS or user device/UE, or another network node) 1200 according to an example embodiment. The wireless station 1200 may include, for example, one or more (e.g., two as shown) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 6, a controller (or processor) 1208 may execute software and instructions, and may provide overall control for the station 1200, and may provide control for other systems not shown in FIG. 6, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Example embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an example embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
    at least one processor; and
    at least one memory including computer program code;
    the at least one memory and the computer program code configured to, with the at least one processor, cause the apparatus at least to:
        receive, by a user device from a network node, a configuration including at least an indication to perform spectrum extension;
        determine, by the user device, a target extension factor for excess band frequency resources for a target spectrum extension;
        receive, by the user device from the network node, information indicating a set of inband frequency resources allocated to the user device for uplink transmission;
        determine, by the user device based on the set of inband frequency resources and the target extension factor, the excess band frequency resources for the spectrum extension and a total allocation of frequency resources for uplink transmission, wherein the total allocation of frequency resources includes the inband frequency resources and the excess band frequency resources;
        perform, by the user device, a spectrum extension based on the excess band frequency resources for a set of frequency domain values, to obtain a spectrum extended signal;
        determine, by the user device, that the excess band frequency resources include an odd number of resource blocks or one or more orphan resource elements that are part of a fractional resource block;
        shift, by the user device, the total allocation including the inband frequency resources and the first half and the second half of the excess band frequency resources, by one half of a resource block in the frequency domain so that the resource blocks of the total allocation are resource block aligned with a grid of resource blocks; and
    transmit the spectrum extended signal.

2. The apparatus of claim 1, wherein the at least one processor and the computer program code configured to cause the apparatus to determine, by the user device, the target extension factor comprises the at least one processor and the computer program code configured to cause the apparatus to:
    receive, by the user device from the network node, information identifying the target extension factor for a target extension to determine the excess band frequency resources for the spectrum extension.

3. The apparatus of claim 1, wherein the at least one processor and the computer program code are further configured to cause the apparatus to:
    transmit, by the user device to the network node, information indicating that the user device has a capability to perform spectrum extension for uplink transmission.

4. The apparatus of claim 1, wherein the at least one processor and the computer program code configured to cause the apparatus to perform the spectrum extension comprises the at least one processor and the computer program code configured to cause the apparatus to:
    perform, by the user device, a symmetric extension to the inband frequency resources by appending a first half of the excess band frequency resources to an upper end of the inband frequency resources and appending a second half of the excess band frequency resources to a lower end of the inband frequency resources.

5. The apparatus of claim 1, wherein the at least one processor and the computer program code configured to cause the apparatus to perform the spectrum extension comprises the at least one processor and the computer program code configured to cause the apparatus to:
perform, by the user device, a symmetric extension to the inband frequency resources by appending a number of lowest inband frequency resources to the excess band frequency resources adjacent to the highest inband frequency resources, and appending the number of higher inband frequency resources to the excess band frequency resources adjacent to the lowest inband frequency resources.

6. The apparatus of claim 1, wherein the configuration received from the network node comprises:
information indicating the inband frequency resources including one or more of: a starting resource block of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of a bandwidth part; and
the target extension factor for the target spectrum extension.

7. The apparatus of claim 1, wherein:
a size (M) of the set of inband frequency resources comprises a number (M) of occupied resource elements or subcarriers after a Discrete Fourier Transform (DFT) block, wherein the number (M) of resource elements or subcarriers of the inband frequency resources are an integer number of 12 resource elements or subcarriers, wherein a resource block comprises 12 resource elements or subcarriers;
a size of the total allocation (Q) of frequency resources comprises a sum of resource elements for the inband frequency resources and the excess band frequency resources for the target spectrum extension; and
a size of the excess band frequency resources for the target spectrum extension based on the target extension factor comprises a number of resource elements of (Q-M), wherein the size of the excess band frequency resources comprises a difference between the size of the total allocation (Q) and the number (M) of resource elements or subcarriers of the inband frequency resources.

8. The apparatus of claim 1, wherein the at least one processor and the computer program code configured to cause the apparatus to determine, by the user device based on the set of inband frequency resources and the target extension factor, the excess band frequency resources for the spectrum extension and the total allocation of frequency resources for uplink transmission comprises the at least one processor and the computer program code configured to cause the apparatus to determine at least one of the following:
a number of resource elements for the total allocation=[(a number of resource elements for the set of inband frequency resources)/(1−the target extension factor)];
a number of resource elements for excess band allocation=[[(a number of resource elements for the set of inband frequency resources)*the target extension factor/(1−the target extension factor)]; and/or
a number of resource elements for the set of inband frequency resources=[(the number of resource elements for the total allocation)*(1−the target extension factor)].

9. The apparatus of claim 1, wherein if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the at least one processor and the computer program code are further configured to cause the apparatus to perform at least one of the following:
treat the one or more orphan resource elements as guard band or unused resource elements;
round up or down, the excess band based on the target extension factor that includes a fractional resource block to a nearest integer number of resource blocks;
round up or down, the total allocation of frequency resources based on the target extension factor that includes a fractional resource block to a nearest integer number of resource blocks;
consider or determine sizes of the excess band for the target spectrum extension that result in an excess band or total allocation that include a fractional resource block as being an invalid resource allocation from the network node.

10. The apparatus of claim 1, wherein the at least one processor and the computer program code configured to cause the apparatus to perform the spectrum extension comprises the at least one processor and the computer program code configured to cause the apparatus to perform a symmetric extension to the inband frequency resources by appending a first half of the excess band frequency resources to an upper end of the inband frequency resources and appending a second half of the excess band frequency resources to a lower end of the inband frequency resources;
the at least one processor and the computer program code are further configured to cause the apparatus to:
determine, by the user device, that the excess band frequency resources include an odd number of resource blocks or one or more orphan resource elements that are part of a fractional resource block; and
shift, by the user device, the total allocation including the inband frequency resources and the first half and the second half of the excess band frequency resources, by one half of a resource block in the frequency domain so that the resource blocks of the total allocation are resource block aligned with a grid of resource blocks.

11. A method comprising:
receiving, by a user device from a network node, a configuration including at least an indication to perform spectrum extension;
determining, by the user device, a target extension factor for excess band frequency resources for a target spectrum extension;
receiving, by the user device from the network node, information indicating a set of inband frequency resources allocated to the user device for uplink transmission;
determining, by the user device based on the set of inband frequency resources and the target extension factor, the excess band frequency resources for the spectrum extension and a total allocation of frequency resources for uplink transmission, wherein the total allocation of frequency resources includes the inband frequency resources and the excess band frequency resources;

performing, by the user device, a spectrum extension based on the excess band frequency resources for a set of frequency domain values, to obtain a spectrum extended signal;

determining, by the user device, that the excess band frequency resources include an odd number of resource blocks or one or more orphan resource elements that are part of a fractional resource block;

shifting, by the user device, the total allocation including the inband frequency resources and the first half and the second half of the excess band frequency resources, by one half of a resource block in the frequency domain so that the resource blocks of the total allocation are resource block aligned with a grid of resource blocks; and transmitting the spectrum extended signal.

12. The method of claim 11, wherein determining, by the user device, the target extension factor comprises:

receiving by the user device from the network node, information identifying the target extension factor for a target extension to determine the excess band frequency resources for the spectrum extension.

13. The method of claim 11, further comprising:

transmitting, by the user device to the network node, information indicating that the user device has a capability to perform spectrum extension for uplink transmission.

14. The method of claim 11, wherein the performing the spectrum extension comprises:

performing, by the user device, a symmetric extension to the inband frequency resources by appending a first half of the excess band frequency resources to an upper end of the inband frequency resources and appending a second half of the excess band frequency resources to a lower end of the inband frequency resources.

15. The method of claim 11, wherein the performing the spectrum extension comprises:

performing, by the user device, a symmetric extension to the inband frequency resources by appending a number of lowest inband frequency resources to the excess band frequency resources adjacent to the highest inband frequency resources, and appending the number of higher inband frequency resources to the excess band frequency resources adjacent to the lowest inband frequency resources.

16. The method of claim 11, wherein the configuration received from the network node comprises:

information indicating the inband frequency resources including one or more of: a starting resource block of the inband frequency resources, an ending resource block of the inband frequency resources, a size or amount of resource blocks for the inband frequency resources, a bitmap indicating one or more Resource Block Groups (RBGs) that are allocated to the user device, where a RBG is a set of consecutive virtual resource blocks defined by higher layer parameter rbg-Size and the size of a bandwidth part; and the target extension factor for the target spectrum extension.

17. The method of claim 11, wherein:

a size (M) of the set of inband frequency resources comprises a number (M) of occupied resource elements or subcarriers after a Discrete Fourier Transform (DFT) block, wherein the number (M) of resource elements or subcarriers of the inband frequency resources are an integer number of 12 resource elements or subcarriers, wherein a resource block comprises 12 resource elements or subcarriers;

a size of the total allocation (Q) of frequency resources comprises a sum of resource elements for the inband frequency resources and the excess band frequency resources for the target spectrum extension; and a size of the excess band frequency resources for the target spectrum extension based on the target extension factor comprises a number of resource elements of (Q-M), wherein the size of the excess band frequency resources comprises a difference between the size of the total allocation (Q) and the number (M) of resource elements or subcarriers of the inband frequency resources.

18. The method of claim 11, wherein the determining, by the user device based on the set of inband frequency resources and the target extension factor, the excess band frequency resources for the spectrum extension and the total allocation of frequency resources for uplink transmission comprises determining at least one of the following:

a number of resource elements for the total allocation=[(a number of resource elements for the set of inband frequency resources)/(1−the target extension factor)];

a number of resource elements for excess band allocation=[[(a number of resource elements for the set of inband frequency resources)*the target extension factor/(1−the target extension factor)]; and/or a number of resource elements for the set of inband frequency resources=[(the number of resource elements for the total allocation)*(1−the target extension factor)].

19. The method of claim 11, wherein if either 1) the size of the excess band frequency resources, based on the target extension factor for the target spectrum extension, is not an integer number of a resource block of resource elements, resulting in total allocation including one or more orphan resource elements that are part of a fractional resource block or are not part of an integer multiple of resource elements, or 2) the excess band frequency resources do not fit within a current uplink bandwidth part or carrier for the user device to perform uplink transmission, the method further comprises performing at least one of the following:

treating or applying the one or more orphan resource elements as guard band or unused resource elements;

rounding up or down, the excess band based on the target extension factor that includes a fractional resource block to a nearest integer number of resource blocks;

rounding up or down, the total allocation of frequency resources based on the target extension factor that includes a fractional resource block to a nearest integer number of resource blocks; and/or considering or determining sizes of the excess band for the target spectrum extension that result in an excess band or total allocation that include a fractional resource block as being an invalid resource allocation from the network node.

* * * * *